A. KINGSBURY.
THRUST BEARING.
APPLICATION FILED JAN. 7, 1913.
1,117,503.
Patented Nov. 17, 1914.
2 SHEETS—SHEET 1.
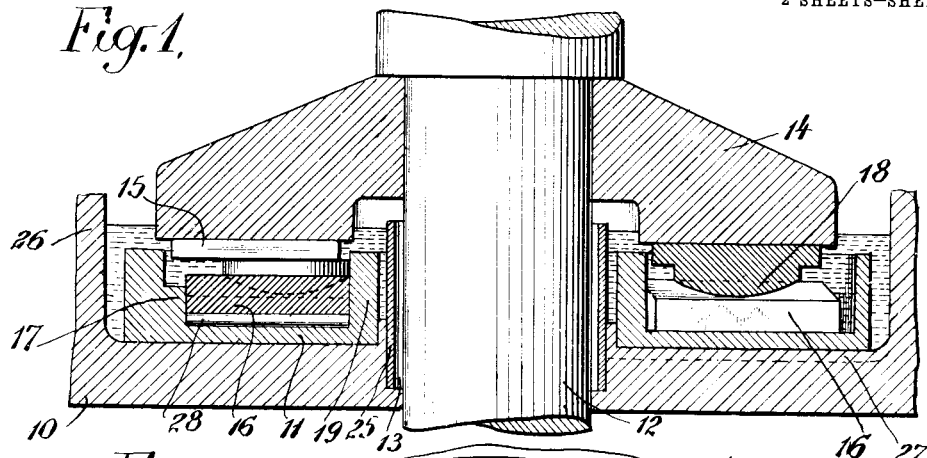
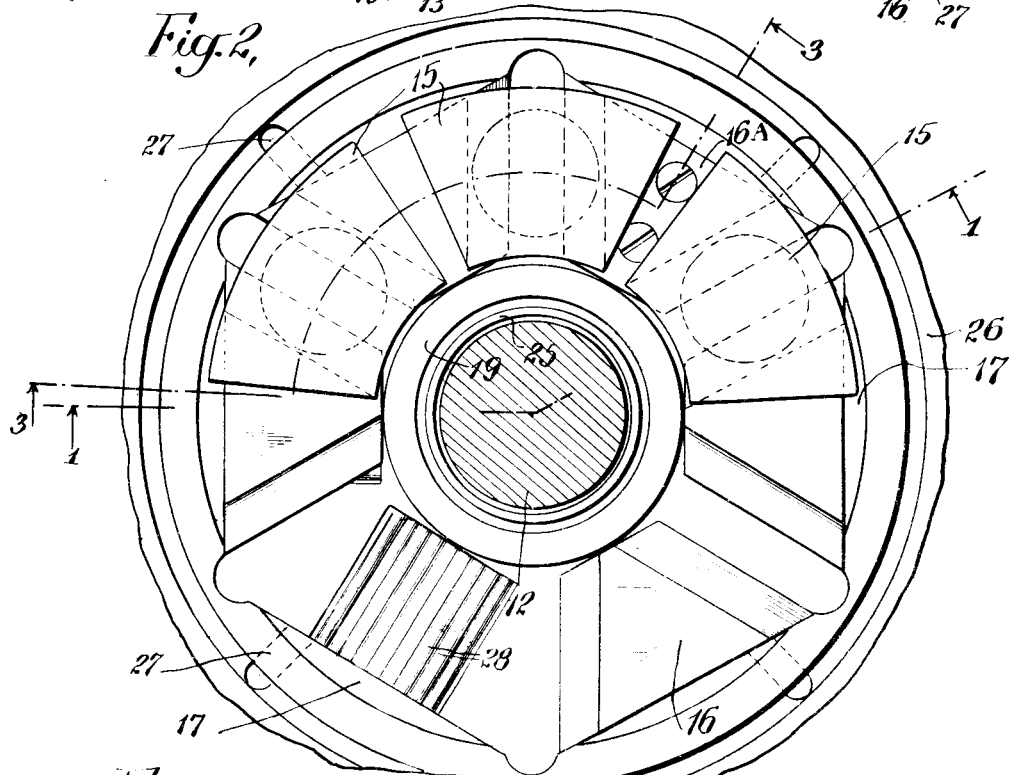
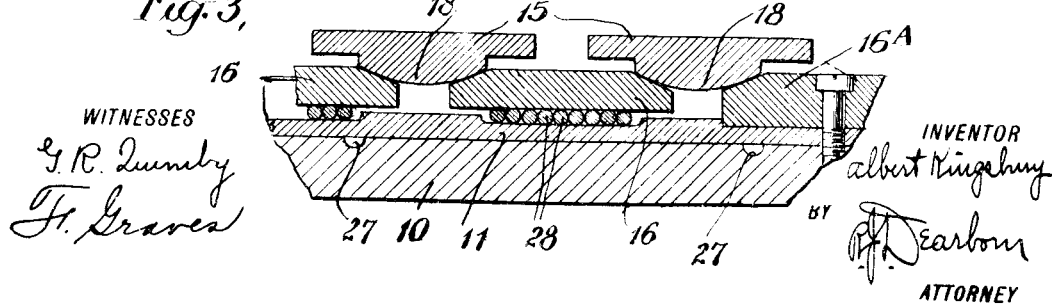
WITNESSES
INVENTOR
Albert Kingsbury
BY
Dearborn
ATTORNEY A. KINGSBURY.
THRUST BEARING.
APPLICATION FILED JAN. 7, 1913.
1,117,503.
Patented Nov. 17, 1914.
2 SHEETS—SHEET 2.
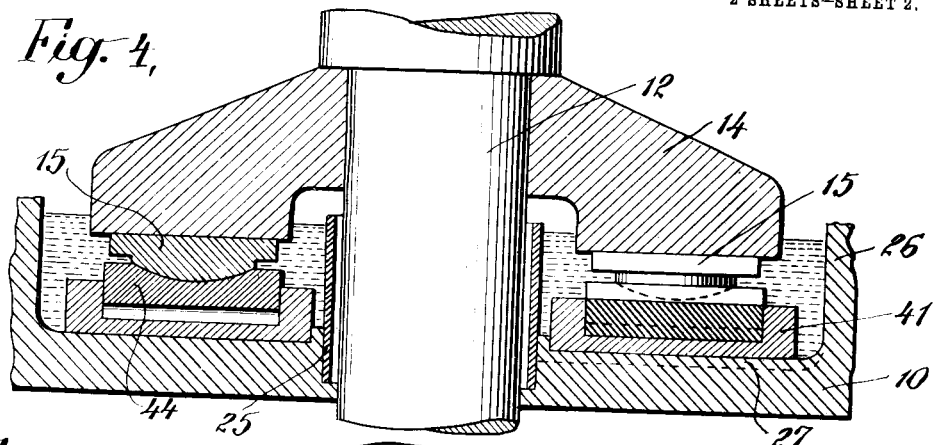
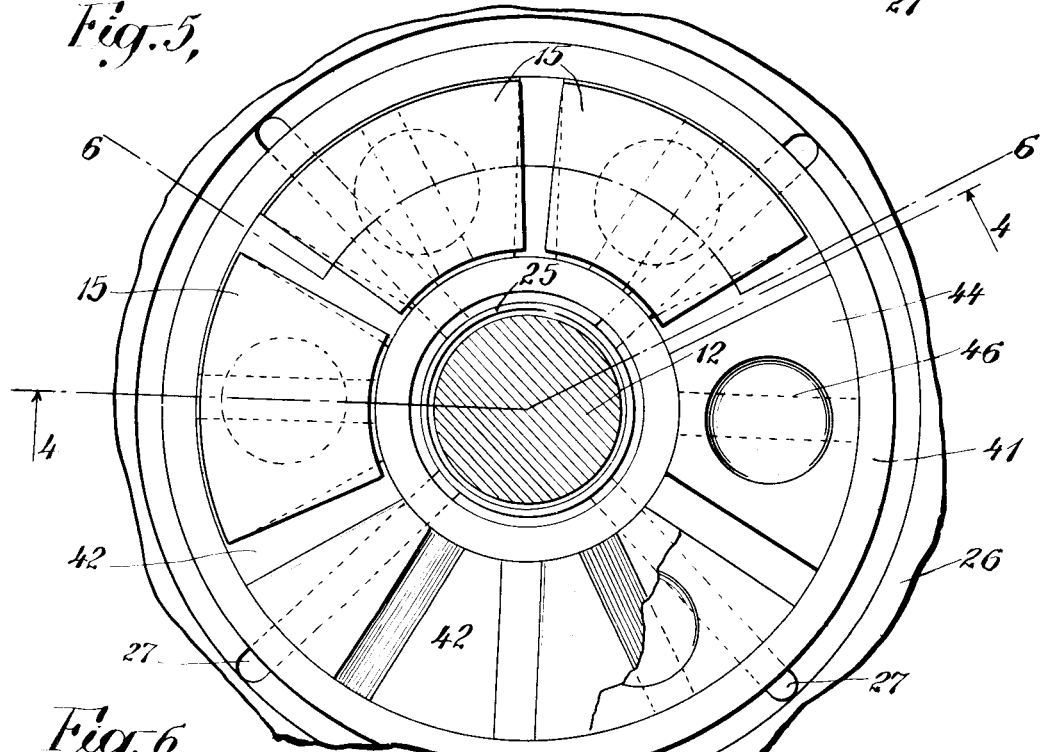
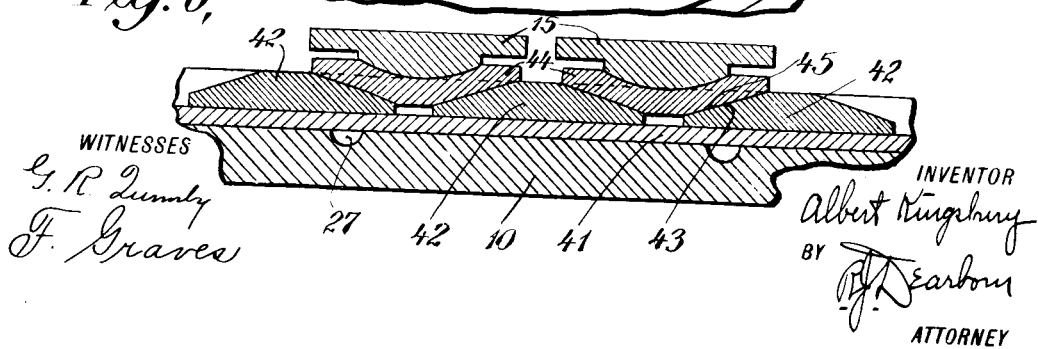
WITNESSES
G. R. Dunnly
F. Graves
INVENTOR
Albert Kingsbury
BY
R. T. Dearborn
ATTORNEY

UNITED STATES PATENT OFFICE.

ALBERT KINGSBURY, OF PITTSBURGH, PENNSYLVANIA.

THRUST-BEARING.

1,117,503.  Specification of Letters Patent.  Patented Nov. 17, 1914.

Original application filed May 9, 1911, Serial No. 626,363. Divided and this application filed January 7, 1913. Serial No. 740,602.

*To all whom it may concern:*

Be it known that I, ALBERT KINGSBURY, a citizen of the United States, and a resident of Pittsburgh, county of Allegheny, and State of Pennsylvania, have invented certain new and useful Improvements in Thrust-Bearings, of which the following is a specification, reference being had to the accompanying drawings, forming a part thereof.

My invention relates to thrust bearings which are adapted to sustain relatively high pressures between the contacting surfaces and it has special reference to bearings which comprise a plurality of radial shoes so arranged that a film of lubricating fluid is automatically maintained between the coöperating surfaces.

The object of my invention is to provide a bearing of the aforesaid class that shall be simple and durable in construction and so arranged that the pressure is equally distributed upon the radial shoes of which the bearing is comprised.

This application is a division of my copending application Serial No. 626,363 filed May 9th, 1911, and I have included a preferred specific structure (see Figures 1, 2 and 3) embodying the same invention.

I will describe my invention in the following specification and point out the novel features thereof in appended claims.

In the drawings, Fig. 1 is a sectional elevation on the line 1—1 of Fig. 2 and Fig. 2 is a plan view with certain of the parts removed of a bearing constructed in accordance with my invention. Fig. 3 is a sectional view, developed into a single plane, taken on the line 3—3 of Fig. 2. Figs. 4, 5 and 6 are views corresponding respectively to Figs. 1, 2 and 3 of a modified structure embodying my invention.

Like characters of reference indicate corresponding parts in all the figures.

Referring to Figs. 1, 2 and 3 of the drawings, the structure here shown comprises a relatively stationary base 10 having an integral or attached channel-shaped member 11, a rotatable shaft 12, which extends through a hole 13 in the base, a collar 14 mounted on the shaft, and a plurality of similar contact shoes 15 and supporting blocks 16. The blocks 16 are adjustably supported in the channel of the member 11 and are guided by an outer hexagonal wall 17. The blocks are substantially rhomboidal in form and have their adjacent edges inclined to provide radial wedge-shaped channels. The shoes 15 have projections 18 with spherically curved bottom surfaces which rest upon the inclined surfaces of adjacent blocks. They are thus pivotally supported and the downward pressure upon each shoe exerted by the shaft collar and its load tends to force apart the two blocks, on which it is supported. Consequently the total thrust pressure sustained by the bearing is equalized among the several shoes.

The inner wall 19 of the channel shaped member may be of any desired shape or omitted entirely since there is always a component of the forces acting upon the blocks which tends to force the blocks against the outer hexagonal wall 17. The corners of the hexagon may be cut away so that the faces can be easily machined.

25 is a sleeve which surrounds the shaft and is secured to the base 10 which has an outer wall and forms an annular oil chamber or reservoir. The bearing surfaces can thus be immersed in oil. Radial slots 27 are provided in the base so that the oil may circulate under the channel shaped member 11.

In order to reduce the friction between the spaced blocks and the base surfaces on which they bear, rollers or balls 28 or other suitable means may be introduced as shown in Fig. 3. In any case one of the blocks such as 16* should be secured to the base or otherwise prevented from revolving with the shaft.

While I have shown a channel member having hexagonal walls this member may be provided with any member of symmetrical sides arranged in the form of a polygon and in fact the outer wall may be cylindrical. The latter arrangement is illustrated in Figs. 4, 5 and 6 of the drawings to which reference will now be had. The base 10 of this structure has an annular channel-shaped member 41 and a plurality of spaced blocks 42 having inclined surfaces 43, are equally disposed about the shaft 12 in the channel. The openings between the members 42 are bridged by a series of blocks 44 having inclined surfaces 45 which are adapted to coöperate with the surfaces 43 of the spaced blocks and are also located in the channel. Each of the members 44 is provided with a spherically curved recess 46 and pivotally supports one of the bearing shoes 15.

In operation the spaced blocks adjust themselves in the channel of the member 42 until the pressure on the bearing is equally distributed among the shoes.

What I claim is:

1. A bearing comprising a base having retaining means, a plurality of spaced equalizing blocks having inclined adjacent surfaces, adjustable on the base and guided by the retaining means, and bearing shoes bridging the gaps between the spaced blocks and tiltably supported on the adjacent inclined surfaces thereof.

2. A bearing comprising a base having retaining means, a plurality of circumferentially arranged spaced equalizing blocks having inclined adjacent surfaces, adjustable on the base and guided by the retaining means, and bearing shoes bridging the gaps between the spaced blocks and tiltably supported on the adjacent inclined surfaces thereof.

3. A bearing comprising a base having an outer retaining wall, a plurality of spaced equalizing blocks within the wall, and bearing shoes bridging the gaps between the spaced blocks and tiltably supported on adjacent edges thereof.

4. A bearing comprising a base having a retaining wall, a plurality of spaced equalizing blocks adjustable on the base along the wall and having inclined adjacent surfaces forming radial channels and a plurality of bearing shoes tiltably seated in the radial channels and supported on the inclined surfaces of the blocks.

5. A bearing comprising a base having a polygonal retaining wall, a plurality of spaced equalizing blocks adjustable on the base along the wall and having inclined adjacent surfaces forming radial channels and a plurality of bearing shoes tiltably seated in the radial channels on the inclined surfaces.

6. A bearing comprising a base, having a polygonal retaining wall, a plurality of spaced equalizing blocks adjustable on the base adjacent to the polygonal surfaces and having inclined adjacent surfaces forming radial channels and a plurality of bearing shoes having spherically curved bottom surfaces seated in the radial channels on the inclined surfaces of the block.

7. A bearing member comprising a base having retaining members, arranged to constitute the sides of a polygon, a plurality of spaced equalizing blocks adjustable on the base and respectively guided by the retaining members and having inclined adjacent surfaces forming radial wedge-shaped channels between the blocks, and a plurality of bearing shoes having downwardly extending projections with spherically curved bottom surfaces, bridging the gaps between the spaced blocks, the spherically curved surfaces of the shoes resting on the adjacent inclined surfaces of the blocks.

8. A thrust bearing comprising a horizontal fixed base having an outer retaining wall, a plurality of spaced equalizing blocks slidably resting upon said base, each of the equalizing blocks having its upper edges beveled to form with adjacent blocks radial open channels with oppositely inclined bearing surfaces; and a plurality of bearing shoes having spherically curved convex under surfaces resting upon the bearing surfaces of said channels and tending to push said equalizing blocks apart and against the retaining wall, said shoes having flat upper surfaces, and a shaft collar resting upon the flat surfaces of said shoes.

9. A thrust bearing comprising a horizontal fixed base having an outer retaining wall, a plurality of spaced equalizing blocks slidably resting upon said base, one of said blocks being connected with the base, each of the equalizing blocks having its upper edges beveled to form with adjacent blocks radial open channels with oppositely inclined bearing surfaces; and a plurality of bearing shoes having spherically curved convex under surfaces resting upon the bearing surfaces of said channels and tending to push said equalizing blocks apart and against the retaining wall, said shoes having flat upper surfaces, and a shaft collar resting upon the flat surfaces of said shoes.

In witness whereof, I have hereunto set my hand this 2nd day of January in the year 1913.

ALBERT KINGSBURY.

Witnesses:
A. M. LUNDY,
B. B. HINES.

Copies of this patent may be obtained for five cents each, by addressing the "Commissioner of Patents, Washington, D. C."